United States Patent
Bender et al.

(10) Patent No.: US 9,894,073 B1
(45) Date of Patent: *Feb. 13, 2018

(54) TRACKING MANAGEMENT SYSTEM FOR DEVICES

(71) Applicant: International Business Machines Corporation, Armonk, NY (US)

(72) Inventors: Michael Bender, Rye Brook, NY (US); Rhonda L. Childress, Austn, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,442

(22) Filed: Nov. 30, 2016

Related U.S. Application Data

(63) Continuation-in-part of application No. 15/293,906, filed on Oct. 14, 2016.

(51) Int. Cl.
*H04W 4/02* (2009.01)
*H04L 29/06* (2006.01)

(52) U.S. Cl.
CPC ............. *H04L 63/10* (2013.01); *H04W 4/02* (2013.01)

(58) Field of Classification Search
CPC ........... H04M 1/72572; H04M 3/2281; H04M 15/28; H04M 1/72577; H04M 17/10; H04M 2203/6081; G06F 2221/2149; H04W 12/06; H04W 12/08; H04W 4/02; H04W 4/24; H04W 64/00; H04N 21/4751; H04N 21/44213; H04N 21/8355; H04L 12/2602

See application file for complete search history.

(56) References Cited

U.S. PATENT DOCUMENTS

| | | | |
|---|---|---|---|
| 8,284,748 B2 | 10/2012 | Borghei | |
| 8,798,593 B2 | 8/2014 | Haney | |
| 8,831,635 B2 | 9/2014 | Haney | |
| 9,173,061 B2 | 10/2015 | Varoglu et al. | |
| 2011/0162091 A1 | 6/2011 | Huang | |
| 2013/0183967 A1* | 7/2013 | Olker | H04W 8/22 455/435.1 |
| 2013/0212484 A1 | 8/2013 | Joshi et al. | |
| 2014/0057663 A1 | 2/2014 | Lui et al. | |
| 2014/0164101 A1* | 6/2014 | S | G06Q 30/0267 705/14.45 |

(Continued)

FOREIGN PATENT DOCUMENTS

| | | |
|---|---|---|
| CN | 101742011 B * | 9/2013 |
| WO | 2008049202 A1 | 5/2008 |
| WO | 2016126690 A1 | 8/2016 |

OTHER PUBLICATIONS

IMSI Catchers and Mobile Security by Professor Nadia Heninger School of Engineering and Applied Science University of Pennsylvania Apr. 29, 2015.*

(Continued)

*Primary Examiner* — Nizar Sivji
(74) *Attorney, Agent, or Firm* — Jeffrey S. LaBaw

(57) ABSTRACT

A method for managing data consumption for a device. The method comprises a processor unit that monitors for a consumption request for data generated by the device in which a prior request has been made to halt consuming the data. The processor unit overrides the prior request when a legal override is present for the consumption request, enabling secret consumption of the data.

15 Claims, 8 Drawing Sheets

(56) References Cited

U.S. PATENT DOCUMENTS

2015/0018012 A1      1/2015   Jeon et al.

OTHER PUBLICATIONS

Is your smartphone being tracked? We asked an expert dated May 17, 2015.*

Digital Wiretap Warrant: Improving the security of ETSI Lawful Interception.*

Lawful Hacking: Using Existing Vulnerabilities for wiretapping on the internet.*

Office Action, dated Jul. 28, 2017, regarding U.S. Appl. No. 15/293,906, 25 pages.

Tene et al., "To Track or "Do Not Track": Advancing Transparency and Individual Control in Online Behavioral Advertising," Minnesota Journal of Law, Science & Technology, vol. 13, Issue 1, Article 9, Feb. 2012, 78 pages.

Roesner et al., "Detecting and Defending Against Third-Party Tracking on the Web," 9th USENIX Symposium on Networked Systems Design and Implementation (NSDI), 2012, 14 pages.

Leon et al., "Why Johnny Can't Opt Out: A Usability Evaluation of Tools to Limit Online Behavioral Advertising," Proceedings of the SIGCHI Conference on Human Factors in Computing Systems, ACM, May, 2012, 39 pages.

Firefox, "How do I turn on the Do Not Track feature?" Mozilla Support, retrieved Sep. 1, 2016, 2 pages. https://support.mozilla.org/en-US/kb/how-do-i-turn-do-not-track-feature?redirectlocale+en-US&redirectsug+how-do-i-stop-web-sites-tracking-me.

Komando, "Stop stores and airports from tracking your movements," The Kim Komando Show, Fox News, Nov. 2015, 8 pages. http://www.foxnews.com/tech/2015/11/28/stop-stores-and-airports-from-tracking-your-movements.html.

Bender et al., "Tracking Management System for Devices," U.S. Appl. No. 15/293,906, filed Oct. 14, 2016, 34 pages.

List of IBM Patents or Patent Applications Treated as Related, 2 pages.

Notice of Allowance, dated Oct. 2, 2017, regarding U.S. Appl. No. 15/293,906, 11 pages.

\* cited by examiner

TRACKING MANAGEMENT SYSTEM FOR DEVICES

CROSS-REFERENCE TO RELATED APPLICATION

This application is a continuation-in-part of patent application U.S. Ser. No. 15/293,906, filed Oct. 14, 2016, entitled "Tracking Management System for Devices," which is incorporated herein by reference in its entirety.

BACKGROUND

1. Field

The present invention relates generally to an improved network data processing system and, in particular, to a method and apparatus to manage consumption of data from devices in a network data processing system.

2. Description of the Related Art

Tracking the location and actions of users is commonly performed. For example, mobile phones transmit location data such as global positioning system (GPS) signals that indicate the location of mobile phones. In other cases, the location of mobile phones may be identified based on the wireless signals detected at cell towers.

As another example, the activities of users may be tracked through devices that connect to a wireless network run by a business. For example, many businesses provide wireless access at stores, stadiums, restaurants, or other locations. For example, the media access control (MAC) address may be identified and used to track the movement of the device within a store. Further, the media access control address may be used to determine how frequently the user with the device visits the store, how long the device stays in a particular department, how long the device stays in the store, as well as other information. Further, websites accessed, documents downloaded, and other activities may be monitored through the wireless access run by the business.

If the user does not want to be tracked in a store or other location, currently, the user has to remember to turn off the mobile phone or place the mobile phone in airplane mode that allows the mobile phone to operate but suspends radio frequency transmissions by the device. As a result, Bluetooth, global positioning system signals, cellular signals, and Wi-Fi signals may be turned off.

This type of process may be inconvenient and requires the user to remember to turn off the mobile phone or place the mobile phone into airplane mode. Then, the user has to remember to turn on the mobile phone or remove the mobile phone from airplane mode when the user desires other functions of the mobile phone.

SUMMARY

An embodiment of the present disclosure provides for a method for managing data consumption for a device. The method comprises a processor unit that monitors for a consumption request for data generated by the device in which a prior request has been made to halt consuming the data. The processor unit overrides the prior request when a legal override is present for the consumption request, enabling secret consumption of the data.

Another embodiment of the present disclosure provides for a computer system. The computer system comprises a processor unit and a data manager that runs on the processor unit. The data manager monitors for a consumption request for data generated by the device in which a prior request has been made to halt consuming the data and overrides the prior request when a legal override is present for the consumption request, enabling secret consumption of data.

Yet another embodiment of the present disclosure provides for a computer program product for managing data consumption for a device. The computer program product comprises a computer-readable storage media, a first program code and a second program code. The first program code is stored on the computer-readable storage media and monitors for a consumption request for data generated by the device in which a prior request has been made to halt consuming the data. The second program code is stored on the computer-readable storage media and overrides the prior request when a legal override is present for the consumption request, enabling secret consumption of the data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and the features thereof, will best be understood by reference to the following detailed description of an illustrative embodiment of the present disclosure when read in conjunction with the accompanying drawings, wherein:

DETAILED DESCRIPTION

Figure 1:
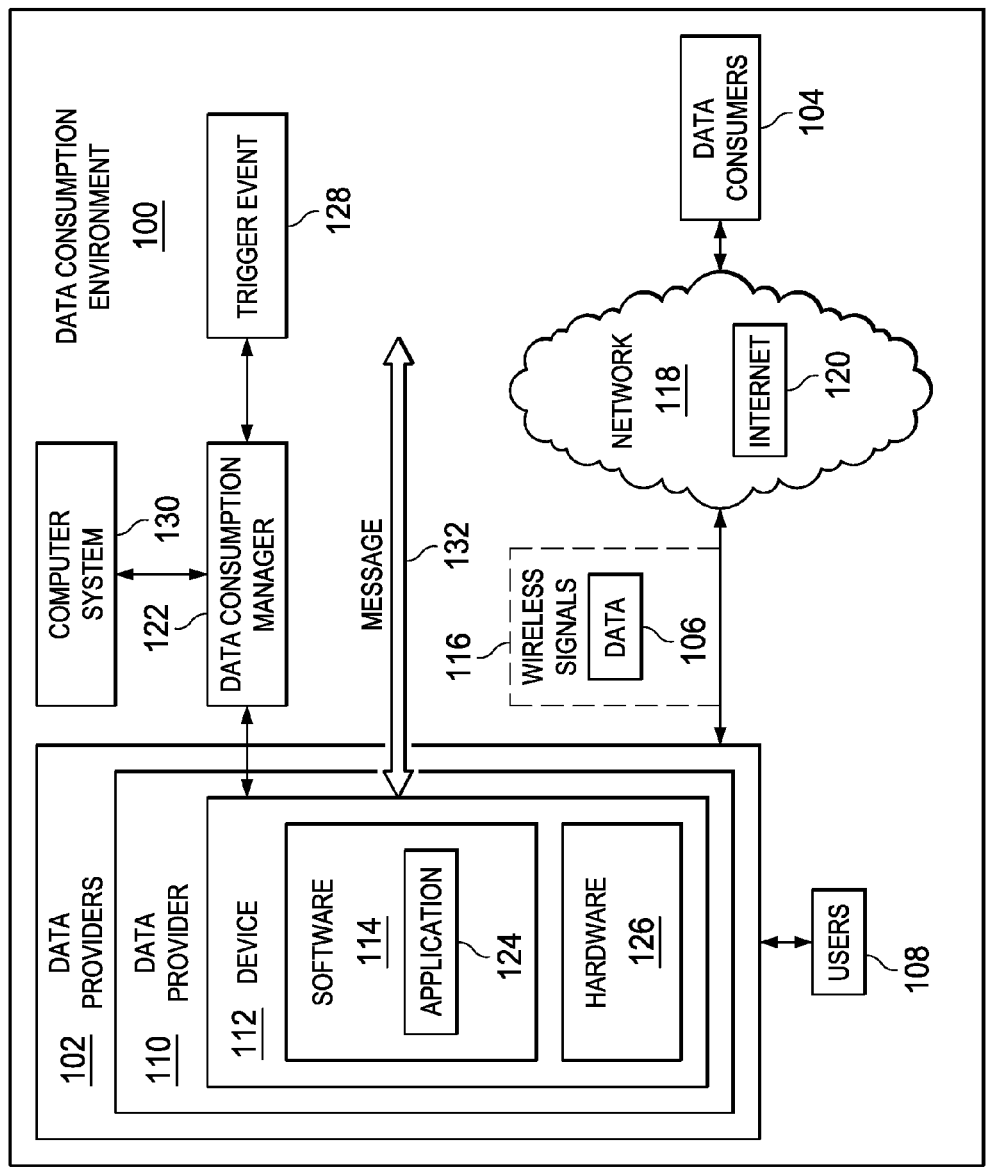
FIG. 1 is an illustration of a block diagram of a data consumption environment in accordance with an illustrative embodiment.

The illustrative embodiments recognize and take into account one or more different considerations. For example, the illustrative embodiments recognize and take into account that managing the tracking of data from devices may be more difficult than desired. Having a user enable and disable wireless capabilities requires the user to remember when to enable and disable the capabilities of the device.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction processing device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network (LAN), a wide area network (WAN), and/or a wireless network. The network may comprise copper transmission cables, optical transmission fibers, wireless transmission routers, firewalls, switches, gateway computers and/or edge servers. A network adapter card or a network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network, a wide area network, or the connection may be made to an external computer, for example, through the Internet using an internet service provider. In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more program code instructions for implementing the specified logical function or functions. In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions, acts, or carry out combinations of special purpose hardware and computer instructions.

Thus, the illustrative embodiments provide a method and apparatus for managing data consumption for a device. In one illustrative example, a process detects a trigger event for the device. The device sends a message to stop collecting information from the device by a group of data consumers.

With reference now to the figures and, in particular, with reference to FIG. 1, an illustration of a block diagram of a data consumption environment is depicted in accordance with an illustrative embodiment. As depicted, data consumption environment 100 includes data providers 102 and data consumers 104.

In this illustrative example, data providers 102 generate data 106 that may be consumed by data consumers 104. In this illustrative example, data 106 may be used to track the activities of users 108 who use data providers 102. These activities include, for example, locations of users 108, websites visited, images downloaded, documents downloaded, and other activities for which data 106 may be generated. In this example, the consumption data includes at least one of collecting, storing, using, or otherwise handling data 106.

As depicted, data providers 102 may take a number of different forms. For example, data provider 110 may be selected from at least one of hardware or software. For example, data provider 110 may be selected from at least one of device 112 or software 114 running on device 112. Further, data provider 110 may be one or more applications in software 114.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C, or item B and item C. Of course, any combination of these items may be present. In some illustrative examples, "at least one of" may be, for example, without limitation, two of item A, one of item B, and ten of item C; four of item B and seven of item C; or other suitable combinations.

In the illustrative example, data consumers 104 may take a number of different forms. For example, data consumers 104 may be selected from at least one of a website, an application, a mobile application, a web service, a social media service, a data mining tool, a database, a facial recognition system, a location sharing service, or some other suitable type of entity that uses data 106. In this illustrative example, data consumers 104 are connected to or are part of network 118.

As depicted, device 112 may transmit data 106 using wireless signals 116. Wireless signals 116 maybe selected from at least one of radio frequency signals or optical signals. Radio frequency signals may include at least one of Bluetooth signals, global positioning system signals, cellular signals, Wi-Fi signals, or other suitable types of signals. Wireless signals 116 may be used to communicate or send data 106 to various computer systems or other devices in communication with network 118. As depicted, network 118 is internet 120 in this particular example.

As depicted, data consumption manager 122 manages data 106 transmitted from device 112. In this example, the transmission of data 106 is the transmission from application 124 in software 114 running on device 112. Application 124 may take various forms. For example, application 124 may be selected from a group comprising a browser, a mobile application, a social media application, a social networking application, a professional networking application, a location-based service, a web application, or other suitable type of software that may run on hardware 126 in device 112. In other examples, the transmission of data 106 may be performed by hardware 126 without using application 124 in device 112.

In this illustrative example, data consumption manager 122 is configured to manage data consumption of data 106 generated by device 112. In other words, data consumption manager 122 may control when data consumers 104 may have to consume data 106 generated by device 112.

As depicted, data consumption manager 122 is configured to perform different operations to manage data consumption of data 106 generated by device 112. In one illustrative example, data consumption manager 122 detects trigger event 128 for device 112. When trigger event 128 occurs, message 132 is sent to stop the consumption of data 106 from device 112 by a group of data consumers in data consumers 104.

As used herein, a "group of" when used in reference to items means one or more items. For example, a group of data consumers is one or more data consumers.

Further, device 112 may still access network 118 using wireless signals 116 while the consumption of data 106 by a group of data consumers in data consumers 104 is restricted. This restriction may be some or all of data 106 from device 112.

Data consumption manager 122 may be implemented in software, hardware, firmware or a combination thereof. When software is used, the operations performed by data consumption manager 122 may be implemented in a program code configured to run on hardware, such as a processor unit. When firmware is used, the operations performed by data consumption manager 122 may be implemented in program code and data stored in persistent memory to run on a processor unit. When hardware is employed, the hardware may include circuits that operate to perform the operations in data consumption manager 122.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform a number of operations. Programmable logic devices include, for example, a programmable logic array, a programmable array logic, a field programmable logic array, a field programmable gate array, or other suitable hardware devices. Additionally, the processes may be implemented in organic components integrated with inorganic components and may be comprised entirely of organic components, excluding a human being. For example, the processes may be implemented as circuits in organic semiconductors.

As depicted, data consumption manager 122 may be implemented in a number of different locations. In one illustrative example, data consumption manager 122 may be located in device 112. In another illustrative example, data consumption manager 122 may be implemented in computer system 130. Computer system 130 is one or more data processing systems. When more than one data processing system is present, those data processing systems communicate using a communications medium, such as network 118. The data processing systems may be selected from at least one of a server computer, a desktop computer, a laptop computer, a mobile device, a tablet computer, or some other suitable type of data processing device.

In one illustrative example, one or more technical solutions are present that overcome a technical problem with managing the use of data 106 from data providers 102 by data consumers 104. As a result, one or more technical solutions may provide a technical effect providing an ability to selectively stop the consumption of data 106 from device 112 in data provider 110 by a group of data consumers in data consumers 104. Additionally, the use of data 106 by data consumers 104 may be restarted in the different illustrative examples.

The management of the use of data 106 is performed using data consumption manager 122. Data consumption manager 122 manages the use of data 106 through detecting trigger event 128. In this manner, only trigger event 128 is needed instead of a complex number of steps in which the user turns off the wireless connectivity of device 112. With data consumption manager 122, device 112 may continue to access network 118 using wireless signals 116 while the consumption of data 106 is prevented for a group of data consumers in data consumers 104.

Consumption of data 106 may be managed to provide for users operating data providers 102. For example, an ability to avoid having the movement of users 108 being tracked occurs using data consumption manager 122. Additionally, detecting the presence of users at particular locations also may be avoided using data consumption manager 122.

Further, one or more technical solutions provide the ability for individual data providers in data providers 102 to control access to data 106 for that particular individual data provider. In other words, a user using a data provider may control access to data 106 generated by the data provider.

As a result, at least one of device 112 or computer system 130 operates as a special purpose device or computer system in which data consumption manager 122 in at least one of device 112 or computer system 130 enables managing the use of data 106 by a group of data consumers in data consumers 104 while device 112 remains connected to network 118 and, in particular, internet 120 using wireless signals 116. In particular, data consumption manager 122 transforms at least one of device 112 or computer system 130 into a special purpose device or computer system as compared to currently available general computer systems that do not have data consumption manager 122. In this illustrative example, device 112 is a computer system having a single data processing system.

Figure 2:
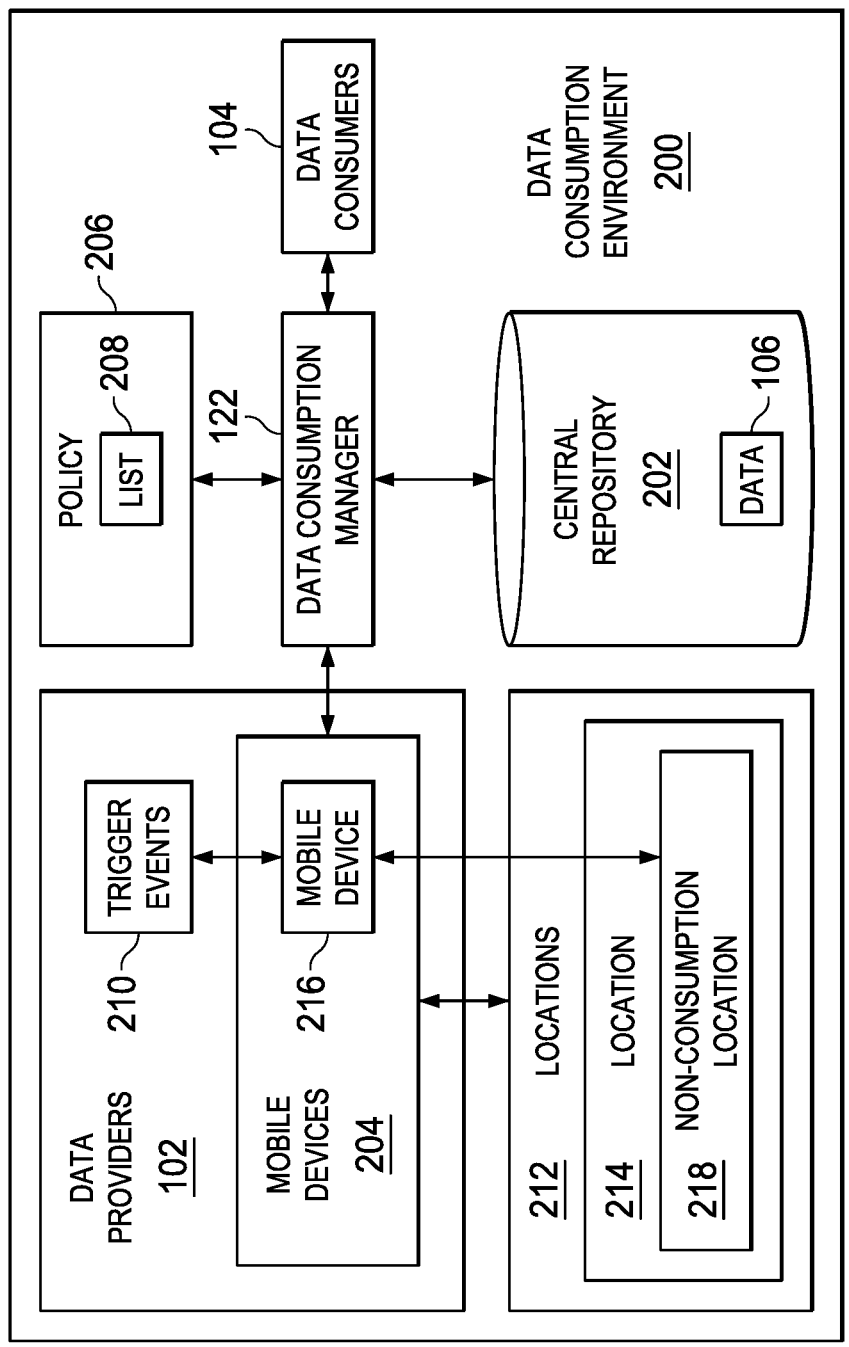
FIG. 2 is an illustration of a block diagram of a data consumption environment in accordance with an illustrative embodiment.

Turning next to FIG. 2, an illustration of a block diagram of a data consumption environment is depicted in accordance with an illustrative embodiment. In the illustrative examples, the same reference numeral may be used in more than one figure. This reuse of a reference numeral in different figures represents the same element in the different figures.

As depicted, data consumption environment 200 is an example of a more specific implementation of data consumption environment 100 in FIG. 1. In this illustrative example, data consumption environment 200 includes central repository 202. Central repository 202 is a hardware system that includes software. For example, central repository 202 may comprise at least one of a computer system, a network attached storage, a data storage server, a cloud repository, or some other suitable hardware system.

Central repository 202 also may include processes, such as a database manager to perform at least one of receiving, storing, or managing access to data 106 stored in central repository 202. In this illustrative example, central repository 202 receives and stores data 106 obtained from data providers 102.

In this example, data providers 102 take the form of mobile devices 204. Mobile devices 204 are hardware systems that also include software. Mobile devices 204 may be selected from at least one of a mobile phone, a tablet computer, a laptop computer, an ultra notebook, or some other suitable type of mobile data processing system.

In this illustrative example, data consumption manager 122 is located at central repository 202. Data consumption manager 122 may be located within central repository 202 or may be otherwise in communication with central repository 202. Data consumption manager 122 controls access of data 106 stored in central repository 202.

For example, data consumption manager 122 controls the access to data 106 by data consumers 104. In this example, data consumption manager 122 controls access to data 106 using policy 206. Policy 206 is a group of rules and also may include data that is applied to the group of rules to determine when and which ones of data consumers 104 may access data 106 stored in central repository 202. For example, policy 206 includes data in the form of list 208 of data providers 102 that may access data 106 stored in central repository 202. In a similar fashion, list 208 also may include data providers 102 that may not access data 106 stored in central repository 202.

In this illustrative example, data consumers 104 that desire to access data 106 stored in central repository 202, register for use of data 106. For example, the registration is handled through at least one of data consumption manager 122 or central repository 202. In this manner, data consumption manager 122 may notify which ones of data consumers 104 access which portions of data 106.

In this illustrative example, mobile devices 204 generate trigger events 210. Trigger events 210, in this example, are based on locations 212 of mobile devices 204. Trigger events 210 may be coordinates for global positioning system information.

In one example, location 214 in locations 212 is non-consumption location 218 in which data 106 is not to be consumed by a group of data consumers in data consumers 104 when mobile device 216 in mobile devices 204 is present in location 214. The identification of location 214 as non-consumption location 218 is performed using policy 206 in this example.

As depicted, location 214 is selected from at least one of a geofence, a store, a stadium, an airport, a building, a shopping center, or some other suitable type of location. In this illustrative example, policy 206 defines a group of locations in locations 212 in which the group of data consumers in data consumers 104 should not consume data 106.

In this illustrative example, data consumers 104 check with data consumption manager 122 to determine whether any of data consumers 104 are allowed to consume data 106 for any of mobile devices 204. For example, data consumers 104 may send requests to data consumption manager 122. In return, data consumption manager 122 applies policy 206 to the requests to determine whether access will be provided to data 106. In some cases, access may be provided to consume some of data 106 depending on locations 212 of mobile devices 204.

In another illustrative example, data consumption manager 122 may be distributed in data consumers 104. In this manner, data consumers 104 may determine whether access to data 106 in central repository 202 is permitted to consume data 106 using data consumption manager 122. In other words, a copy or an instance of data consumption manager 122 may be present at each of data consumers 104.

Further, in some cases, portion of data 106 may be accessed by data consumers 104. For example, data 106 may be filtered or modified such that an identification of users for mobile device 216 cannot be made using data 106.

With data consumption environment 200, one or more technical solutions are present in which access to data 106 is controlled by central repository 202. Central repository 202 indicates whether data 106 for mobile devices 204 may be consumed by data consumers 104. This indication may be made using a number of different mechanisms. For example, access may be denied or restricted to indicate that data 106 should not be consumed for a particular one of mobile devices 204. As another example, data consumers 104 may obtain identifications of which mobile devices 204 generate data 106 that may be consumed by data consumers 104.

Figure 3:
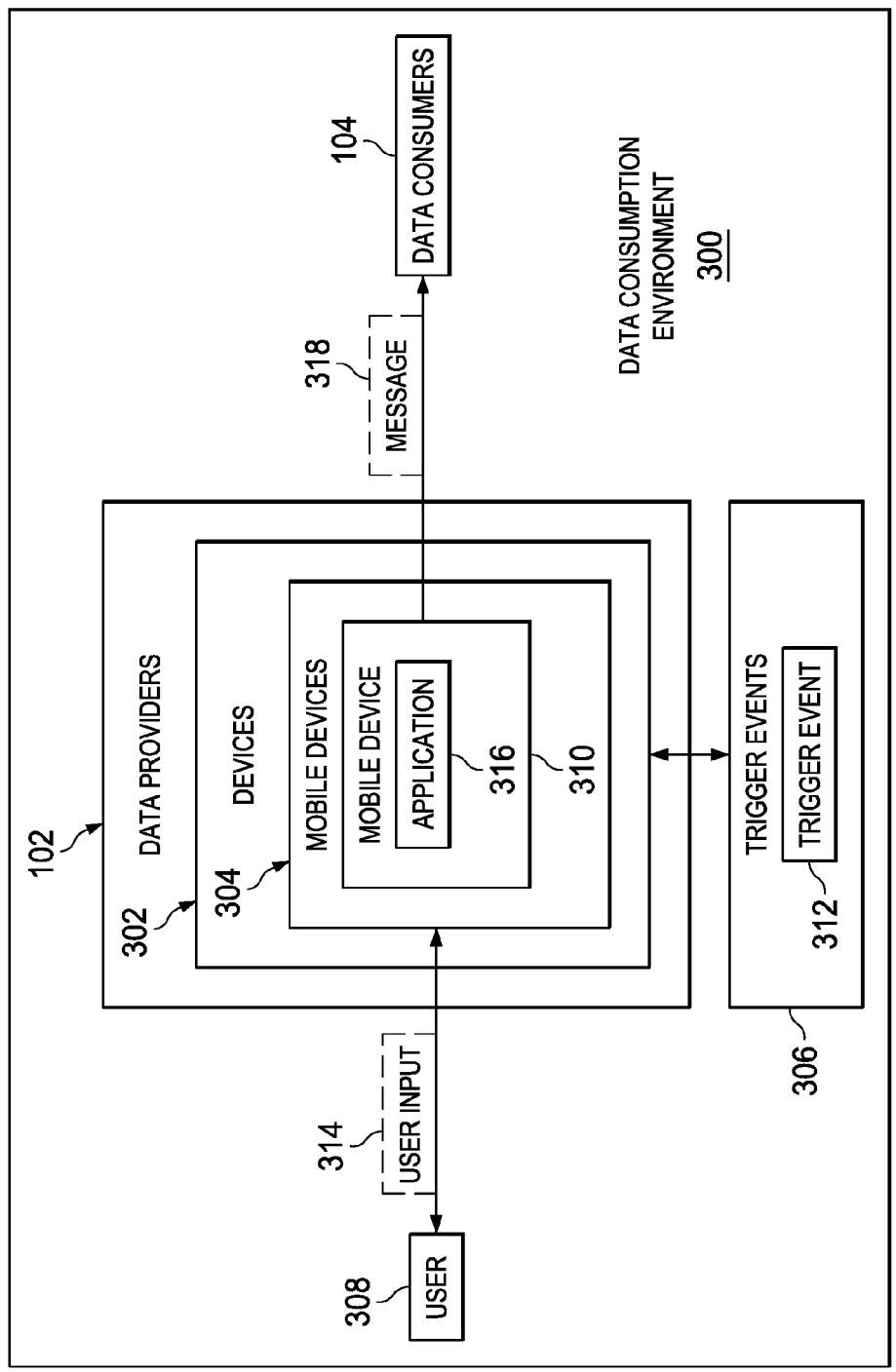
FIG. 3 is an illustration of a block diagram of a data consumption environment in accordance with an illustrative embodiment.

With reference to FIG. 3, an illustration of a block diagram of a data consumption environment is depicted in accordance with an illustrative embodiment. As depicted, data consumption environment 300 is another example of a more specific implementation of data consumption environment 100 in FIG. 1.

In this particular example, data consumption manager 122 in FIG. 1 is distributed on data consumers 104 in the form of devices 302. As depicted, devices 302 include mobile devices 304. Devices 302 may include at least one of a computer, a kiosk, a mobile phone, a tablet computer, a laptop computer, or some other suitable type of device. In being distributed, instances or copies of data consumption manager 122 in FIG. 1 may run on devices 302.

In this illustrative example, trigger events 306 are generated by mobile devices 304. For example, user 308 operating mobile device 310 in mobile devices 304 may cause mobile device 310 to generate trigger event 312 in trigger events 306 through user input 314. In particular, trigger event 312 may be generated by application 316. As depicted, user input 314 may be selected from at least one of a button push, a voice command, or some other user input to halt tracking of mobile device 310.

With this type of implementation, message 318 is sent by mobile device 310 in which message 318 is a request to cease the consumption of data 106 in FIG. 1 from mobile device 310. In this example, message 318 is broadcast to data consumers 104 to cause data consumers 104 to stop accessing or using data 106 generated by mobile device 310. The broadcast may be performed in a number different ways. For example, the broadcast may be sent directly to data consumers 104. In another illustrative example, the broadcast may be sent indirectly to a proxy server, a central repository, a data warehouse, a service, or some other component that causes data providers 102 to stop collecting data 106 from mobile device 310.

Thus, one or more technical solutions are present in data consumption environment 300 that allow for data providers 102 to control consumption of data 106 by data consumers 104. In these illustrative examples, individual mobile devices in mobile devices 304 control access to data 106 that correspond to those individual mobile devices in mobile devices 304. The control includes sending messages directly or indirectly to data consumers 104 to stop using data 106.

Figure 4:
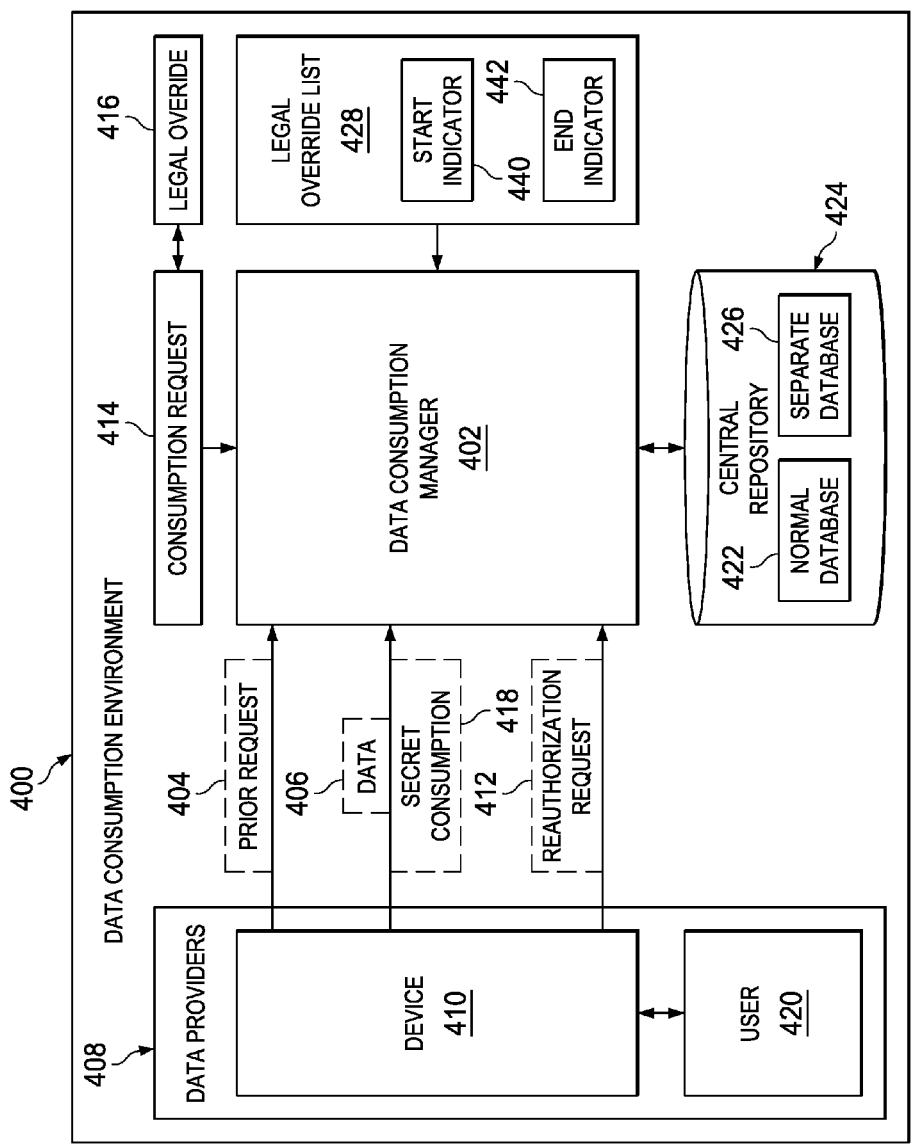
FIG. 4 is an illustration of a block diagram of a data consumption environment in accordance with an illustrative embodiment.

With reference to FIG. 4, an illustration of a block diagram of a data consumption environment is depicted in accordance with an illustrative embodiment. In this example, data consumption environment 400 is an example of an implementation of data consumption environment 100 in FIG. 1.

As depicted, in this example, data consumption manager 402 in data consumption environment 400 has received prior request 404 from data providers 408 regarding consumption of data 406 generated by data providers 408. In this example, data providers 408 are in the form of device 410. Data 406 may take different forms. For example, data 406 may be selected from at least one of Internet of things (TOT) data, images, files, location data, voice data, documents, requests, or other suitable data that may be generated by data providers 408.

With prior request 404, consumption of data 406 is halted in this example. This halt in consuming data 406 remains in place until collection of data 406 is reauthorized. This reauthorization may occur through device 410 generating reauthorization request 412.

In this illustrative example, data consumption manager 402 monitors for consumption request 414 for data 406 generated by device 410, in which prior request 404 has been made to halt consumption of data 406. As depicted, data consumption manager 402 overrides prior request 404 when legal override 416 is present for consumption request 414. Legal override 416 may be based on legal override list 428. In this example, legal override list 428 comprises a list of at least one of a user or a device for which legal override 416 is authorized. Legal override list 428 also may include at least one of a legal document, a court order, a statute, a regulation, an administrative order, or some other source of legal authorization.

As depicted, in this example, legal override list 428 has start indicator 440 and end indicator 442 that identify a period of time during which data 406 is consumed. Start indicator 440 is a start date and may include a start time. End indicator 442 is an end date and may include an end time.

Secret consumption 418 of data 406 is enabled. For example, with secret consumption 418, at least one of device 410, user 420 of device 410, or other entities do not know that consumption of data 406 has occurred when consumption request 414 is received by data consumption manager 402.

In this example, data 406 is normally stored in normal database 422 in central repository 424. When consumption request 414 is received, data 406 is stored in separate database 426 from normal database 422. For example, data 406 generated by device 410 is not stored in normal database 422 while prior request 404 is in effect. Data consumption manager 402 stores data 406 generated while prior request 404 is in effect in separate database 426. Thus, data consumption manager 402 stores additional data generated by device 410 in both separate database 426 and normal database 422 when collection of data 406 is reauthorized. Separate database 426 may be within central repository 424, or in some other location depending on the particular implementation.

As depicted, data 406 in separate database 426 is at least one of hidden or inaccessible to prevent unauthorized access, such that collection of data 406 in separate database 426 is undiscoverable. Collection of data 406 is undiscoverable by at least one of device 410, user 420, or some other entity.

Also, one or more technical solutions are present in data consumption environment 400 that provide the ability for individual data providers in data providers 408 to control access to data 406 for that particular individual data provider. For example, legal overrides may be used to allow for consumption of data from devices even though requests have been made to halt the consumption when legal overrides are present.

The illustration of data consumption environment 100 in FIG. 1 and the different implementations of data consumption environments shown in FIGS. 2-4 are not meant to imply physical or architectural limitations to the manner in which an illustrative embodiment may be implemented. Other components in addition to, or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 1, network 118 may take other forms other than internet 120. For example, network 118 may be selected from at least one of a local area network, a wide area network, an intranet, or some other suitable type of network. As another example, trigger events may be generated for particular applications rather than an entire device. In other words, the trigger events may be used to indicate whether data 106 may be used when generated by particular applications on a particular device. For example, data generated by a social network application may not be used while data generated by a navigation application may be used.

Additionally, data 106 includes all information that may be generated by data providers 102 and not merely information allowing identification of the locations of data providers 102. Further, in some illustrative examples, wireless signals 116 from data providers 102 also may be turned off or cease to be transmitted to prevent consumption of data 106 by data consumers 104. In another example, wireless signals 116 may continue to be present but data 106 may no longer be transmitted over wireless signals 116. In this manner, particular applications may withhold transmitted data 106 generated by those applications.

As another illustrative example, looking at FIG. 4, other sources may make at least one of prior request 404 or reauthorization request 412. For example, another device used by user 420 may make one of these requests.

Figure 5:
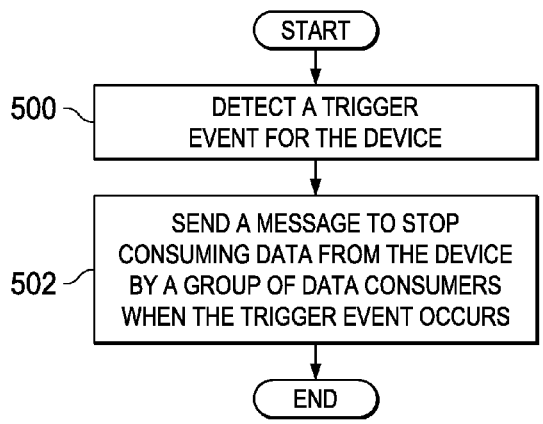
FIG. 5 is an illustration of a flowchart of a process for managing data consumption for a device in accordance with an illustrative embodiment.

Turning next to FIG. 5, an illustration of a flowchart of a process for managing data consumption for a device is depicted in accordance with an illustrative embodiment. The process illustrated in FIG. 5 is implemented in a data consumption manager, such as data consumption manager 122 in FIG. 1. The process illustrated in FIG. 5 for data consumption manager 122 may be implemented in program code that may be run on a processor unit. This processor unit may be located on the device, another device, the computer system, or some other suitable hardware component.

The process begins by detecting a trigger event for the device (step 500). The process sends a message to stop consuming data from the device by a group of data consumers when the trigger event occurs (step 502). The process terminates thereafter.

The process illustrated in FIG. 5 may be used to stop the consumption of data by data consumers. This management of the consumption of data generated by the device may occur without cutting off or reducing the connectivity of the device. In other words, the device may still be connected to the Internet using wireless signals and may still exchange data. In other words, the device may continue to send messages, download websites, and perform other processes that involve exchanging information on a network.

Further, this process does not require multiple steps to perform the management of data consumption. Trigger events are used by data managers to determine when data consumption should halt and begin. Further, data consumption may be filtered such that some data may be used by data consumers depending on the particular implementation.

Figure 6:
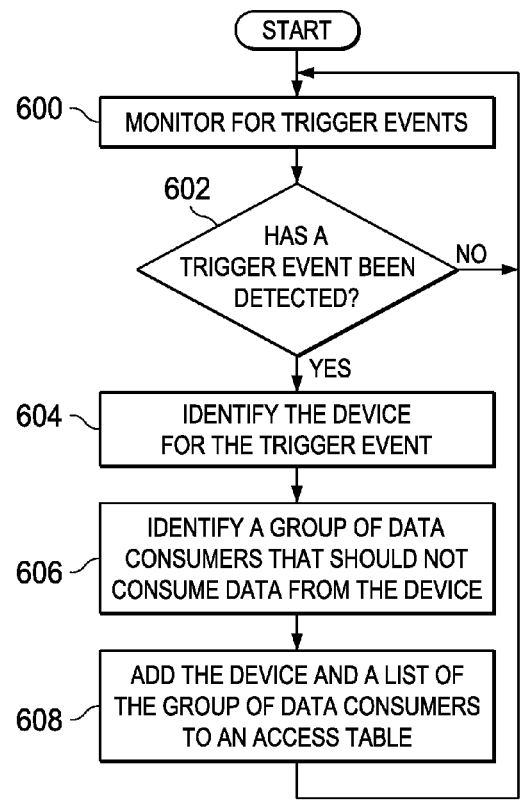
FIG. 6 is an illustration of a flowchart of a process for managing data consumption for a device in accordance with an illustrative embodiment.

With reference next to FIG. 6, an illustration of a flowchart of a process for managing data consumption for a device is depicted in accordance with an illustrative embodiment. The process illustrated in FIG. 6 is implemented in a data consumption manager for a central repository, such as data consumption manager 122 for central repository 202 in FIG. 2. The process for data consumption manager 122 illustrated in FIG. 6 may be implemented in program code that may be run on a processor unit. This processor unit is located in a computer system for the central repository in this illustrative example.

In this particular example, the process may be implemented such that the central repository is used to manage access to data by data consumers. In this manner, a more centralized mechanism is used to manage data consumption. This process is used to identify when data consumption should be prohibited.

The process begins by monitoring for trigger events (step 600). In this illustrative example, trigger events may be present in the data generated by data providers. In other words, data providers do not need to actively generate a request to not be tracked or for data to not be consumed. The identification of trigger events may be made using a policy that identifies locations where the consumption of data generated by data providers should not occur. In other words, the location may be a zone defined using coordinates or other location information. The zone may form a geofence or other type of zone in which the consumption of data generated by one or more data providers may be restricted to one or more data consumers.

The process determines whether a trigger event has been detected (step 602). If a trigger event has not been detected, the process returns to step 600. If a trigger event has been detected, the process identifies the device for the trigger event (step 604). For example, the device may be identified using some unique identifier for the device. In one illustrative example, a media access control (MAC) identifier may be used.

The process then identifies a group of data consumers that should not consume data from the device (step 606). The identification of data consumers is made using a policy. In some cases, the group of data consumers is all of the data consumers while in other cases, the group of the data consumers is only a portion of the data consumers.

The process then adds the device and a list of the group of data consumers to an access table (step 608). The process then returns to step 600. The access table may be a table in the central repository that is used to manage access of the data stored in the central repository when receiving requests from data consumers.

The process in FIG. 6 may be applied to detecting trigger events for any device that may communicate with the central repository. In this manner, a more centralized management of access to data by data consumers may be performed.

Figure 7:
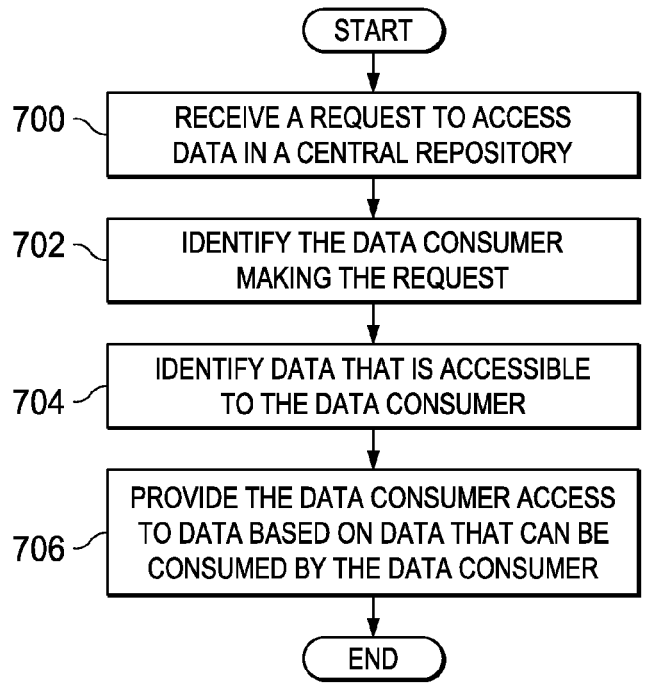
FIG. 7 is an illustration of a flowchart of a process for managing data consumption for a device in accordance with an illustrative embodiment.

With reference next to FIG. 7, an illustration of a flowchart of a process for managing data consumption for a device is depicted in accordance with an illustrative embodiment. The process illustrated in FIG. 7 is implemented in a data consumption manager for a central repository, such as data consumption manager 122 for central repository 202 in FIG. 2. The process for data consumption manager 122 illustrated in FIG. 7 may be implemented in program code that may be run on a processor unit. This processor unit is located in a computer system for the central repository in this illustrative example. In this particular example, the process may be implemented such that the central repository is used to manage access to data in response to receiving requests from data consumers.

The process begins by receiving a request to access data in a central repository (step 700). The process identifies the data consumer making the request (step 702). The process identifies data that is accessible to the data consumer (step 704). In step 704, the process determines whether data is present that cannot be consumed by the data consumer. This determination may be made using the access table in step 608 in FIG. 6.

The process then provides the data consumer access to data based on data that can be consumed by the data consumer (step 706). The process terminates thereafter.

Figure 8:
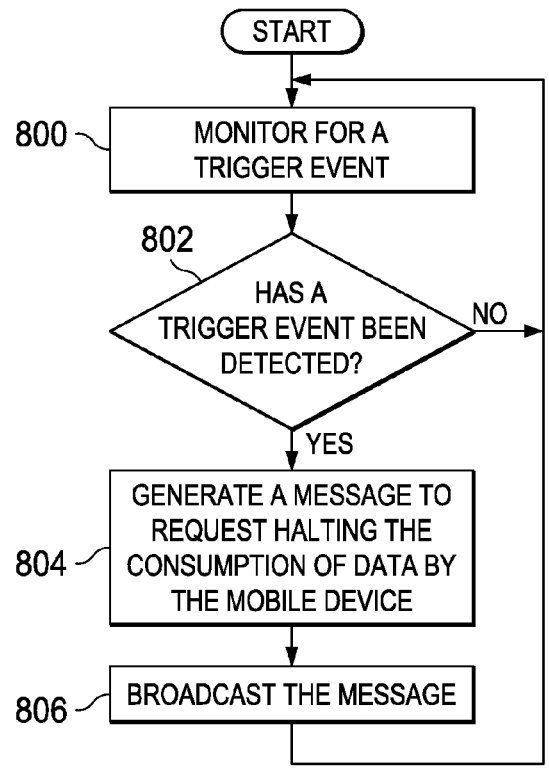
FIG. 8 is an illustration of a flowchart of a process for managing data consumption for a device in accordance with an illustrative embodiment.

Turning to FIG. 8, an illustration of a flowchart of a process for managing data consumption for a device is depicted in accordance with an illustrative embodiment. The process illustrated in FIG. 8 is implemented in a data consumption manager for a device, such as data consumption manager 122 for mobile device 310 in FIG. 3. The process for data consumption manager 122 illustrated in FIG. 8 may be implemented in program code that may be run on a processor unit. This processor unit is the device, in this illustrative example.

The process begins by monitoring for a trigger event (step 800). In this illustrative example, a trigger event may take a number of different forms. For example, the trigger event may be user input indicating that the consumption of data generated by the mobile device is undesired. The user input may be, for example, a pushbutton, a voice command, or some other user input interface to indicate that the consumption of data generated by the data provider is undesired.

In another illustrative example, the trigger event may be based on a location identified for the mobile device. For example, a location such as the region defined by a geo-fence, a store, a building, or other suitable location may be used to determine when the consumption of data from a data provider should be halted.

A determination is made as to whether a trigger event has been detected (step 802). If a trigger event has not been detected, the process returns to step 800.

Otherwise, the process generates a message to request halting the consumption of data by the mobile device (step 804). The process broadcasts the message (step 806). The process then returns to step 800 as described above. This broadcast of the message in step 806 may be sent directly to the data consumers or indirectly through another component, such as a central repository or other system.

In this manner, the consumption of data from a mobile device may be halted when desired. A similar process may be used by the mobile device to indicate when the consumption of data may resume. The resumption of data may be made based on another trigger event with a message being broadcast indicating that the consumption of data from the mobile device may occur.

Figure 9:
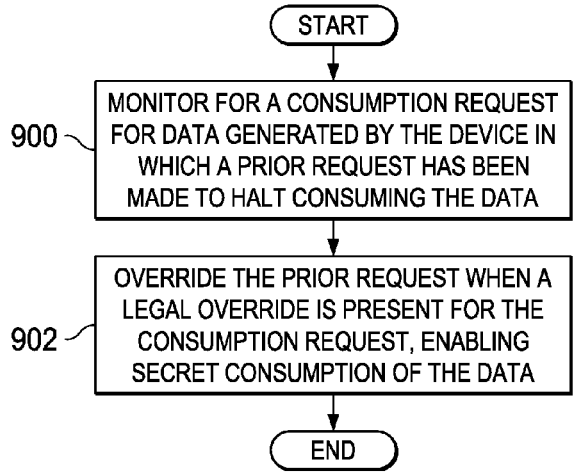
FIG. 9 is an illustration of a flowchart of a process for managing data consumption for a device when a legal override is present in accordance with an illustrative embodiment.

With reference now to FIG. 9, an illustration of a flowchart of a process for managing data consumption for a device when a legal override is present is depicted in accordance with an illustrative embodiment. The process illustrated in FIG. 9 is implemented in a data consumption manager for a device, such as data consumption manager 402 in FIG. 4. The process for data consumption manager 402 illustrated in FIG. 9 may be implemented in program code that may be run on a processor unit. This processor unit is a data processing system for central repository 424 in FIG. 4.

The process begins by monitoring for a consumption request for data generated by the device in which a prior request has been made to halt consuming the data (step 900). The process overrides the prior request when a legal override is present for the consumption request, enabling secret consumption of the data (step 902). The process terminates thereafter.

Figure 10:
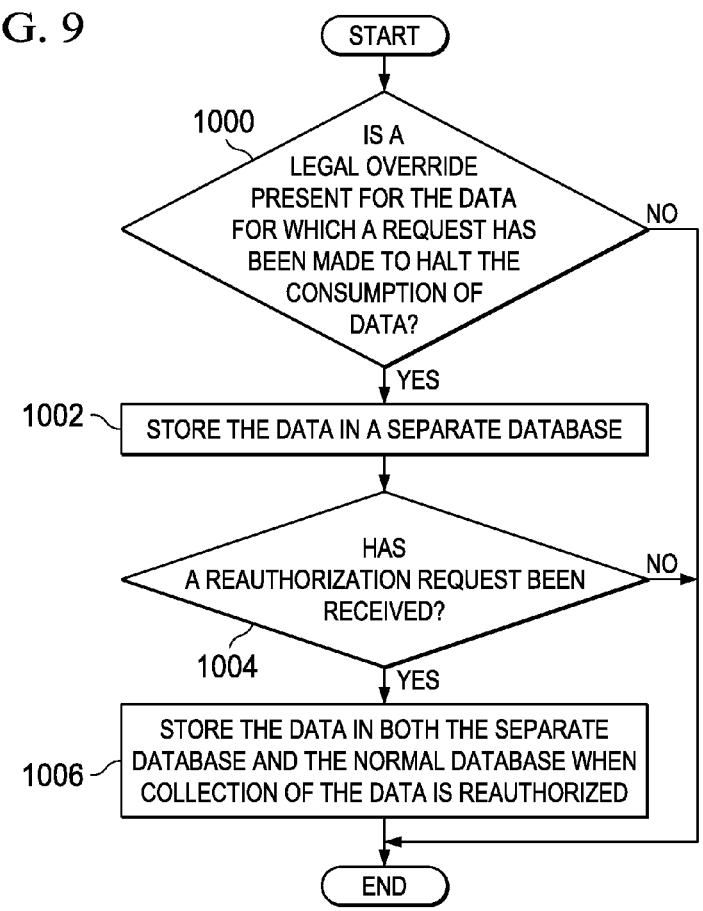
FIG. 10 is an illustration of a flowchart of a process for storing data for a legal override in accordance with an illustrative embodiment.

With reference now to FIG. 10, an illustration of a flowchart of a process for storing data for a legal override is depicted in accordance with an illustrative embodiment. The process illustrated in FIG. 10 is implemented in a data consumption manager for a device, such as data consumption manager 402 in FIG. 4. The process for data consumption manager 402 illustrated in FIG. 10 may be implemented in program code that may be run on a processor unit. This processor unit is a data processing system for central repository 424 in FIG. 4.

The process begins by determining whether a legal override is present for the data for which a request has been made to halt the consumption of data (step 1000). If a legal override is present, the process stores the data in a separate database (step 1002). The separate database is a database separate from the normal database that is normally used to store the data when a request is not present to halt the consumption of data. This separate database is hidden from the user and device, such that the user and device are unaware that the data is being stored. Further, the data is stored such that it is not deleted or overwritten until the data has been used or is no longer needed.

Next, a determination is made as to whether a reauthorization request has been received (step 1004). If a reauthorization request has not been received, the process terminates. Otherwise, the process stores the data in both the separate database and the normal database when collection of the data is reauthorized (step 1006). The process terminates thereafter. In step 1006 the data is additional data generated by the device when collection of the data is reauthorized. With reference again to step 1000, if a legal override is not present, the process also terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in FIG. 6, additional steps may be implemented to filter data instead of prohibiting all access to data by data consumers. For example, identification of the location of the device without data identifying the user may be provided. In this manner, the tracking of general traffic through a location may be made without identifying particular users. As a result, concerns of users with respect to confidentiality may be addressed while still providing information to data consumers.

Figure 11:
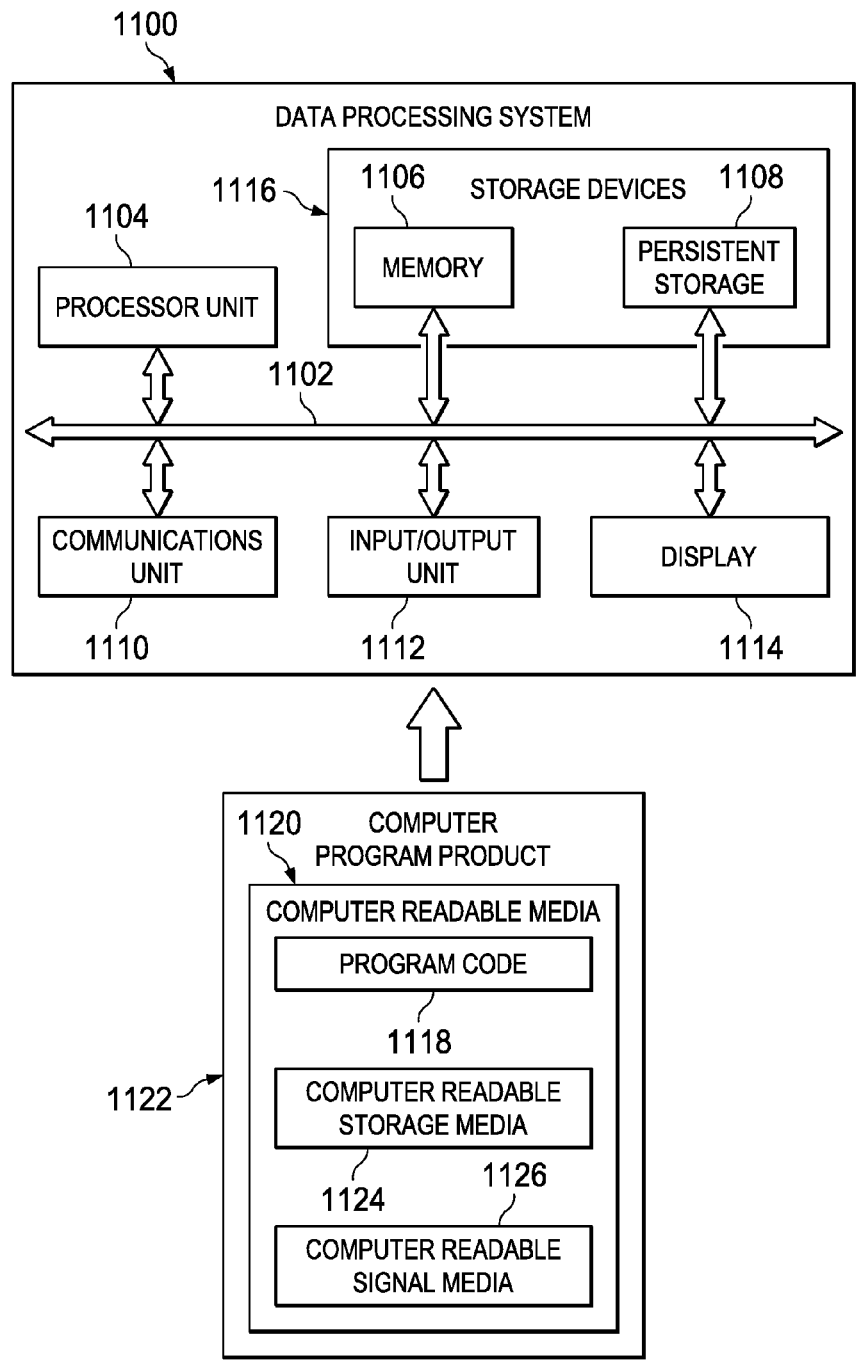
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement hardware for data providers 102 and data consumers 104 in FIG. 1. Additionally, data processing system 1100 may also be used to implement computer system 130 in FIG. 1.

In this illustrative example, data processing system 1100 includes communications framework 1102. As depicted, communications framework 1102 provides communications between processor unit 1104, memory 1106, persistent storage 1108, communications unit 1110, input/output unit 1112, and display 1114. In this example, communication framework 1102 may take the form of a bus system.

Processor unit 1104 serves to run instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 also may be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory drive, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data to other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and processed by a processor in processor unit 1104. The program code in the different embodiments may be embodied on different physical or computer readable storage medium, such as memory 1106 or persistent storage 1108.

Program code 1118 is located in a functional form on computer-readable media 1120 that is selectively removable and may be loaded onto or transferred to data processing system 1100 for processing by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code.

Thus, the illustrative embodiments of the present invention provide a computer implemented method, computer system, and computer program product for managing data consumption of data generated by data providers. In the different illustrative examples, data consumption by data consumers is managed using a data consumption manager. This data consumption manager enables starting and stopping the consumption of data without affecting the ability of data providers to wirelessly connect to a network such as the Internet. Further, the ability to manage the data consumption is performed without a series of complex steps. Instead, a trigger event is monitored for by a data manager to determine when data consumption should be restricted. The halting of data consumption may be for some of the data and not all of the data generated by a device. For example, general data about location and the device without information identifying the user may still be provided in some illustrative examples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more program code instructions for implementing the specified logical function or functions. It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing data consumption for a device, the method comprising:
    monitoring, by a processor unit, for a consumption request for data generated by the device in which a prior request has been made to halt consuming the data;
    overriding, by the processor unit, the prior request when a legal override is present for the consumption request, enabling secret consumption of the data; and
    storing, by the processor unit, the data in a separate database from a normal database for storing the data, wherein the data in the separate database is at least one of hidden or inaccessible to prevent unauthorized access such that collection of the data in the separate database is undiscoverable.

2. The method of claim 1, wherein the data is stored in a central repository.

3. The method of claim 1, wherein the legal override is based on a legal override list.

4. The method of claim 3, wherein the legal override list comprises a list of at least one of a user or a device for which the legal override is authorized.

5. The method of claim 3, wherein the legal override list includes at least one of a legal document, a court order, a statute, a regulation, or an administrative order.

6. A method for managing data consumption for a device, the method comprising:
    monitoring, by a processor unit, for a consumption request for data generated by the device in which a prior request has been made to halt consuming the data;
    overriding, by the processor unit, the prior request when a legal override is present for the consumption request, enabling secret consumption of the data;
    storing, by the processor unit, the data in a separate database from a normal database for storing the data; and
    storing, by the processor unit, additional data generated by the device in both the separate database and the normal database when collection of the data is reauthorized.

7. A computer system comprising:
    a processor unit; and
    a data manager running on the processor unit, wherein the data manager monitors for a consumption request for data generated by a device in which a prior request has been made to halt consuming the data and overrides the prior request when a legal override is present for the consumption request, enabling secret consumption of the data, wherein the data manager stores the data in a separate database from a normal database for storing the data, wherein the data in the separate database is at least one of hidden or inaccessible to prevent unauthorized access such that collection of the data in the separate database is undiscoverable.

8. The computer system of claim 7, wherein the data is stored in a central repository.

9. The computer system of claim 7, wherein the legal override is based on a legal override list.

10. The computer system of claim 9, wherein the legal override list comprises a list of at least one of a user or a device associated with the legal override.

11. The computer system of claim 9, wherein the legal override list includes at least one of a legal document, a court order, a statute, a regulation, or an administrative order.

12. A computer system comprising:
    a processor unit; and
    a data manager running on the processor unit, wherein the data manager monitors for a consumption request for data generated by a device in which a prior request has been made to halt consuming the data and overrides the prior request when a legal override is present for the consumption request, enabling secret consumption of the data, wherein the data manager stores the data in a separate database from a normal database for storing the data, wherein the data manager stores additional data generated by the device in both the separate database and the normal database when collection of the data is reauthorized.

13. A computer program product for managing data consumption for a device, the computer program product comprising:
    a computer-readable storage media;
    first program code, stored on the computer-readable storage media, for monitoring for a consumption request for data generated by the device in which a prior request has been made to halt consuming the data;
    second program code, stored on the computer-readable storage media, for overriding the prior request when a legal override is present for the consumption request, enabling secret consumption of the data; and
    third program code, stored on the computer-readable storage media, for storing the data in a separate database from a normal database for storing the data, wherein the data in the separate database is at least one of hidden or inaccessible to prevent unauthorized access such that collection of the data in the separate database is undiscoverable.

14. A computer program product for managing data consumption for a device, the computer program product comprising:
- a computer-readable storage media;
- first program code, stored on the computer-readable storage media, for monitoring for a consumption request for data generated by the device in which a prior request has been made to halt consuming the data;
- second program code, stored on the computer-readable storage media, for overriding the prior request when a legal override is present for the consumption request, enabling secret consumption of the data;
- third program code, stored on the computer-readable storage media, for storing the data in a separate database from a normal database for storing the data; and
- fourth program code, stored on the computer-readable storage media, for storing additional data generated by the device in both the separate database and the normal database when collection of the data is reauthorized.

15. A method for managing data consumption for a device, the method comprising:
- monitoring, by a processor unit, for a triggering event received by the device to stop consuming data from the device by a data consumer;
- identifying, by the processor unit, the device that sent the triggering even;
- identifying, by the processor unit, the data consumer that should stop consuming data from the device; and
- sending a message, by the processor unit, to the data consumer to stop consuming data from the device, wherein the data from the device is maintained in a central repository, and further comprising:
- receiving, by the processor unit, a reauthorization request from the device to reauthorize the data consumer to consume the data from the device;
- receiving, by the processor unit, a request from the data consumer to access the data by the data consumer;
- identifying, by the processor unit, the data consumer making the request to access the data;
- identifying, by the processor unit, the data from the device that is accessible by the data consumer; and
- providing, by the processor unit to the data consumer, the data from the device that is accessible by the data consumer.

* * * * *